United States Patent
Kashiwabara

[11] Patent Number: 5,318,159
[45] Date of Patent: Jun. 7, 1994

[54] CONTROL DEVICE AND CONTROL METHOD USING TORQUE FEEDBACK OF A LOCK-UP CLUTCH IN AN AUTOMATIC TRANSMISSION

[75] Inventor: Masuo Kashiwabara, Isesaki, Japan

[73] Assignee: Japan Electronic Control Systems Co., Ltd., Isesaki, Japan

[21] Appl. No.: 974,415

[22] Filed: Nov. 12, 1992

[30] Foreign Application Priority Data
Nov. 11, 1991 [JP] Japan .................. 3-294559

[51] Int. Cl.⁵ ........................... F16H 61/14
[52] U.S. Cl. ......................... 477/169; 192/3.31
[58] Field of Search ............. 192/3.3, 3.31, 0.032, 192/0.075, 0.096; 74/890

[56] References Cited
U.S. PATENT DOCUMENTS

| 4,577,737 | 3/1986 | Niikura et al. ........... | 192/3.3 X |
| 4,724,939 | 2/1988 | Lockhart et al. ......... | 192/3.3 |
| 5,029,087 | 7/1991 | Cowan et al. ............ | 192/3.3 X |
| 5,105,926 | 4/1992 | Yoshimura et al. ....... | 192/0.032 |
| 5,226,513 | 7/1993 | Shibayawa ................ | 192/0.032 |

FOREIGN PATENT DOCUMENTS
2-38754   2/1990   Japan .

*Primary Examiner*—Leslie A. Braun
*Assistant Examiner*—Khoi Ta
*Attorney, Agent, or Firm*—Foley & Lardner

[57] ABSTRACT

In an automatic transmission provided with a hydraulic lockup clutch which can directly and mechanically engage an input shaft with an output shaft of a torque converter, input torque of the above torque converter is detected and an working oil pressure supplied to said lockup clutch is detected. And a target oil pressure for said lockup clutch is set based on said input torque, supply of the oil pressure is feedback controlled so that an actual working oil pressure gets close to said target oil pressure, and said lockup clutch is controlled to the semi-clutch state.

17 Claims, 6 Drawing Sheets

CONTROL DEVICE AND CONTROL METHOD USING TORQUE FEEDBACK OF A LOCK-UP CLUTCH IN AN AUTOMATIC TRANSMISSION

BACKGROUND OF THE INVENTION

1. Field of the Invention

The present invention relates to a control device and a control method for an automatic transmission for vehicle and particularly to a device and method for controlling the working oil pressure of a hydraulic clutch (lockup clutch) which mechanically and directly engages an input shaft with an output shaft of a torque converter.

2. Related Art of the Invention

It is well known that the transmission efficiency of a torque converter can be improved by providing a hydraulic lockup clutch which mechanically and directly engages an input shaft with an output shaft of a fluid type torque converter and by locking up the above lockup clutch given a certain condition in a conventional automatic transmission of a vehicle.

During lockup control of the lockup clutch as mentioned above, if the lockup clutch is fully and directly engaged at low speed, when drive train vibration is large, a difference in rotation speeds between the input shaft and the output shaft in the torque converter becomes almost zero. Thus, at low speed, vibration and noise are increased, which is a problem, so that full lockup of the clutch is limited to the high speed side where drive train vibration is less.

In some conventional examples, semi-clutch control (slip lockup control) has been executed on the low speed side, where the drive train vibration is relatively large, by carrying out feedback control of a working oil pressure to be supplied to the lockup clutch so that the difference in rotation speeds between the input shaft and the output shaft of the torque converter becomes a predetermined value. When the above semi-clutch control is executed, efficiency of the torque converter can be improved even on the low speed side as a consequences of the drive train vibration being absorbed by the torque converter.

Also, when the difference in rotation speeds between the input shaft and the output shaft of the torque converter is obtained as mentioned above and the supply hydraulic pressure for the lockup clutch is feedback controlled so that this difference is converged into the neighborhood of zero, the working oil pressure in the full lockup control can be optimized according to input torque of the torque converter (See Japanese Unexamined Patent Publication No. 2-38754).

When lockup of the lockup clutch is to be controlled based on the difference in rotation speeds between the input shaft and the output shaft of the torque converter, engine revolution speed calculated using a detection pulse signal of a crank angle sensor can be used to determine the rotation speed of the input shaft of the torque converter, since the rotation speed of the input shaft is equal to the revolution speed of the engine. In the meantime, the rotation speed of the output shaft can be detected based on car speed and transmission gear ratio calculated from a detection pulse signal of a car speed sensor which obtains a rotation signal from an output shaft of the transmission.

Rotation speed can be determined using sensors which generate pulse signals synchronously with rotation, such as a crank angle sensor and a car speed sensor. The rotation speed may then calculated by obtaining a pulse generation cycle or by counting the number of generated pulses per unit time.

Higher accuracy is generally required for detecting the engine revolution speed crank angle sensor usually has a resolution higher than that of the car speed sensor, meaning that the engine revolution speed Ne is renewed in a shorter cycle.

Thus, the engine revolution speed Ne and a car speed VSP are different in an updating cycle of a rotation speed detected value, and in calculating the difference in rotation speeds of the both, the calculated difference in rotation speeds might be hunting due to a gap in updating timing of each of the rotation speeds regardless of an actual rotation difference, which in turn will lead to an error. This presents a problem since it is hard to execute lockup force control of the lockup clutch with high accuracy based on the difference in rotation speeds.

That is, with a rotation sensor, an updating cycle of calculated rotation speed is governed by the resolution of the sensor, and when the resolution of a sensor is low, a longer updating cycle is required. Then, if a difference in rotation speeds detected by rotation sensors with different resolution is to be obtained, a desired rotation speed difference can not be obtained due to a gap in updating timing, and when the updating timing is to be adjusted, such a problem occurs that updating at high speed becomes impossible or that calculating accuracy deteriorates. Therefore, it has been hard to calculate the difference in rotation speeds between the input and the output shafts of the torque converter at high speed and with high accuracy and it has been impossible to carry out lockup control with high accuracy based on the above difference in rotation speeds.

SUMMARY OF THE INVENTION

The present invention was made in view of the aforementioned problems, and the object of the present invention is to provide a control device and a method with which lockup control for controlling a working oil pressure of a lockup clutch (hydraulic clutch) to bring the lockup clutch into the semi-clutch state can be executed without using information of the above difference in rotation speeds, so that the above lockup control can be carried out with high accuracy.

Another object is to acquire a lockup force of the lockup clutch necessary to make the above difference in rotation speeds a predetermined value in a simple manner.

Still another object is to surely avoid vibration of drive train caused by lockup of the lockup clutch.

Still another object is to control the lockup force of the lockup clutch by discriminating fluctuation of output torque due to normal acceleration or deceleration driving from the vibration of drive train.

Still another object is to control the working oil pressure for the lockup clutch with good convergence.

In order to achieve the above objets, according to a control device and a control method for an automatic transmission for vehicle of the present invention, a torque converter is placed between an output shaft of an engine and an input shaft of a gear type transmission, a hydraulic clutch is provided for mechanically and directly engaging an input shaft with an output shaft of the torque converter, an oil pressure working on the hydraulic clutch is detected and input torque of the above torque converter is detected. And a target of the above oil pressure is set based on the detected input torque, and supply of the working oil pressure for the hydraulic clutch is controlled so that an actual oil pressure gets close to the target oil pressure.

With the above constitution, as a lockup force necessary to bring the hydraulic clutch into a predetermined lockup state can be presumed according to the input torque of the torque converter, the hydraulic clutch can be controlled to the predetermined lockup state by controlling supply of the working oil pressure for the hydraulic clutch so that it becomes the target oil pressure which was set based on the above input torque.

When the above hydraulic clutch is a hydraulic clutch controlled according to a differential pressure between an oil pressure for driving the clutch to the lockup side and an oil pressure for driving the clutch to the release side, it is advantageous that the above differential pressure is detected as an oil pressure working on the hydraulic clutch.

In the case of a hydraulic clutch controlled according to the differential pressure between an oil pressure on the lockup side and an oil pressure on the release side, a target of the above differential pressure is set based on the above input torque, and hydraulic supply is controlled so that the above differential pressure gets close to the target.

Also, in the supply control of the above working oil pressure, it is advantageous that a control value of an oil pressure is proportional-plus-integral controlled based on a deviation between a target oil pressure and an actual oil pressure.

By controlling the oil pressure by proportional-plus-integral control as mentioned above, convergence to the target oil pressure is secured.

Moreover, an intake air flow of an engine and a revolution speed of the engine are detected to set a value in proportion to an air flow per stroke calculated based on the intake air flow and the revolution speed as input torque for the above torque converter.

As mentioned above, with the constitution that the input torque is detected as the air flow per stroke of the engine, a sensor for directly detecting the input torque is not necessary, but the input torque can be indirectly detected by using a sensor generally provided at an electronically controlled fuel injection device.

Also, the target oil pressure set based on the above input torque may be set as an oil pressure to bring a difference in rotation speeds between the input and the output shafts of the above torque converter to a predetermined value.

By this, in the full lockup state of the hydraulic clutch, the hydraulic clutch can be controlled in the semi-clutch state in the driving condition where vibration of drive train is incurred, whereby generation of vibration is restrained and transmission efficiency of the torque converter can be improved.

Also, according to a control device and a control method for an automatic transmission for vehicle of the present invention, torque on the output side of the above torque converter is detected and a fluctuation proportion of the detected torque on the output side is calculated. And supply of the working oil pressure for the above hydraulic clutch is controlled so that the fluctuation proportion of the above output side torque becomes less than a predetermined value.

With the above constitution, fluctuation of the output torque is restrained and the lockup force of the hydraulic clutch can be increased as much as possible, whereby transmission efficiency of the torque converter can be improved.

Here, it may be so constituted that a time during which the output torque of the above torque converter is continuously decreased and a time during which it is continuously increased are measured, respectively, that a maximum value and a minimum value of the output torque are obtained when the above measured time in the decreasing direction and the time in the increasing direction are both less than a predetermined time, and that a deviation between the above maximum and minimum value is calculated as a fluctuation proportion of the output torque.

With the above constitution, control of the working oil pressure for the hydraulic clutch can be executed with discriminating fluctuation of the output torque due to normal acceleration or deceleration from vibration of the drive train.

Also, it is advantageous to calculate a weighted average value of the detected output side torque and to calculate the fluctuation proportion of the torque based on the above weighted average value.

When the weighted average value is used as mentioned above, torque fluctuation with relatively low frequency which gives uncomfortableness to passengers can be detected.

Moreover, it is advantageous to carry out control of the working oil pressure based on the above fluctuation proportion on the output side torque only in the driving condition where the above hydraulic clutch is brought into the semi-clutch state.

By this, in the driving state where the hydraulic clutch can not be brought into the full lockup state due to generation of vibration of the drive train, torque fluctuation can be restrained and the hydraulic clutch can be locked up with a lockup force as high as possible, which contributes to improvement of transmission efficiency of the torque converter.

Other objects and features of the present invention will become apparent in the following explanation referring to the attached drawings.

DESCRIPTION OF THE PREFERRED EMBODIMENT

Preferred embodiments of a control device and a control method for an automatic transmission for vehicle according to the present invention are shown in FIGS. 3 to 8.

With referring to the diagrams showing the based constitution in FIG. 1 and FIG. 2, the preferred embodiments will be hereinafter described according to the above FIG. 3 to FIG. 8.

Figure 3:
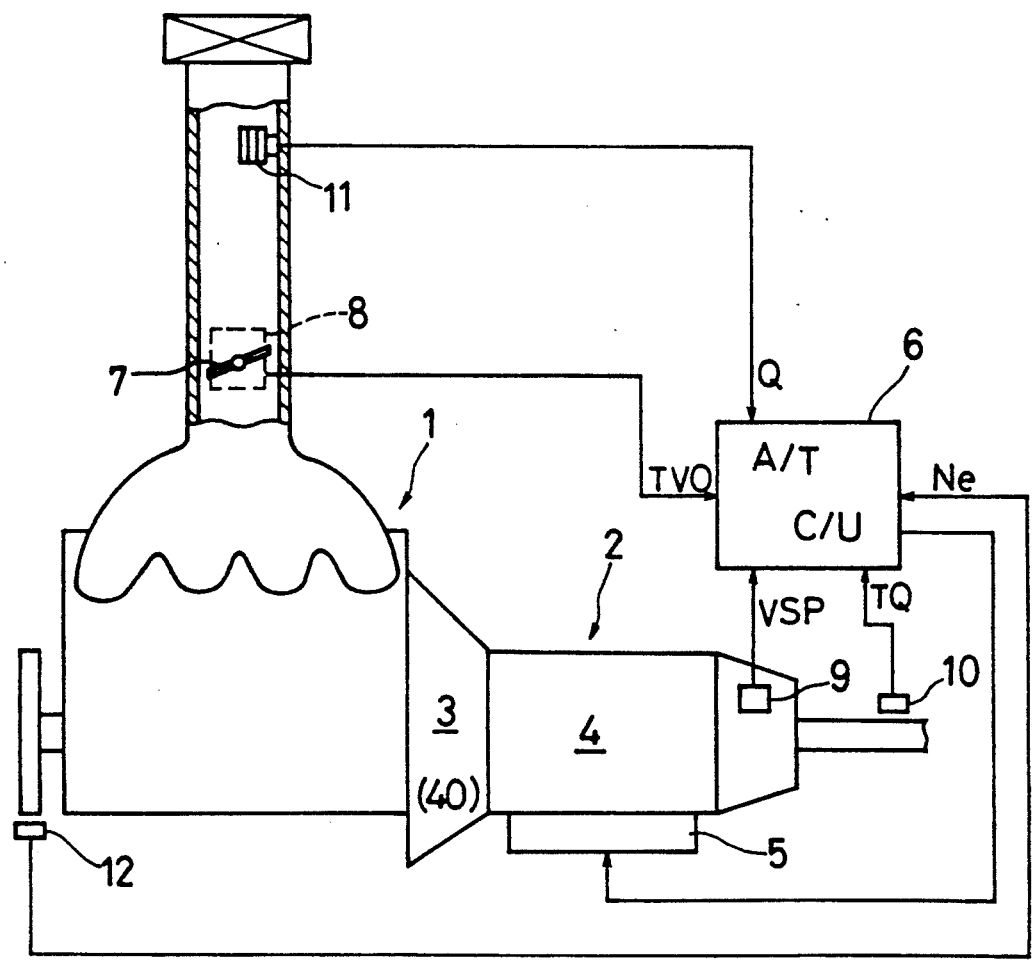
FIG. 3 is a schematic system diagram of an automatic transmission showing a preferred embodiment of the present invention.

In FIG. 3 showing the system constitution of a preferred embodiment, an automatic transmission 2 is connected to the output side of an engine 1 mounted on a vehicle, not shown. This automatic transmission 2 is provided with a torque converter 3 provided on the output side of the engine 1, a gear type transmission 4 which is connected through this torque converter 3 and to which engine output torque is transmitted through the torque converter 3 and a solenoid valve group 5 for transmission control to carry out engaging and releasing operation of various friction elements (front clutch, rear clutch, brake band, overrunning clutch, lockup clutch, etc.), lock up control, line pressure control, engine brake control and so forth. The above solenoid valve group 5 is constituted by a lockup solenoid, a shift solenoid A, a shift solenoid B, an overrunning clutch solenoid, a line pressure solenoid and so forth.

A control unit 6 for automatic transmission for controlling the above solenoid valve group 5 receives signals from various sensors.

As one of the above various sensors, a potentiometer type throttle sensor 8 is provided for detecting an opening degree TVO of a throttle valve 7 which is provided at an intake system of the engine and interlocked with an accel pedal, not shown.

Also, a car speed sensor 9 is provided at an output shaft of the automatic transmission 2 for generating a pulse signal per predetermined rotation angle of the above output shaft, and a torque sensor 10 is provided as an output torque detecting means (See FIG. 2) for putting out a signal of the level according to torque TQ of the above output shaft.

Moreover, there also provided an air flow meter 11 provided on the upstream side of the above throttle valve 7 for putting out a signal of the level according to an intake air flow Q of the engine 1 and a crank angle sensor 12 provided at a crank shaft or a shaft rotated synchronously with the crank shaft of the engine for generating a pulse signal per predetermined rotation angle.

In the meantime, a car speed VSP or engine revolution speed Ne can be detected based on a cycle of a pulse signal put out of the above car speed sensor 9 and the crank angel sensor 21 or the number of pulses generated in a unit time.

The control unit 6 carries out the automatic transmission control based on an operation position signal of a select lever operated by a driver, and when the select lever is in the drive range (D range), for example, it refers to a map of a transmission pattern which is set in advance, automatically sets a transmission position of the first to the fourth speed according to the throttle valve opening degree TVO and the car speed VSP and controls the gear type transmission 4 to the set transmission position through the solenoid valve group 5.

Figure 4:
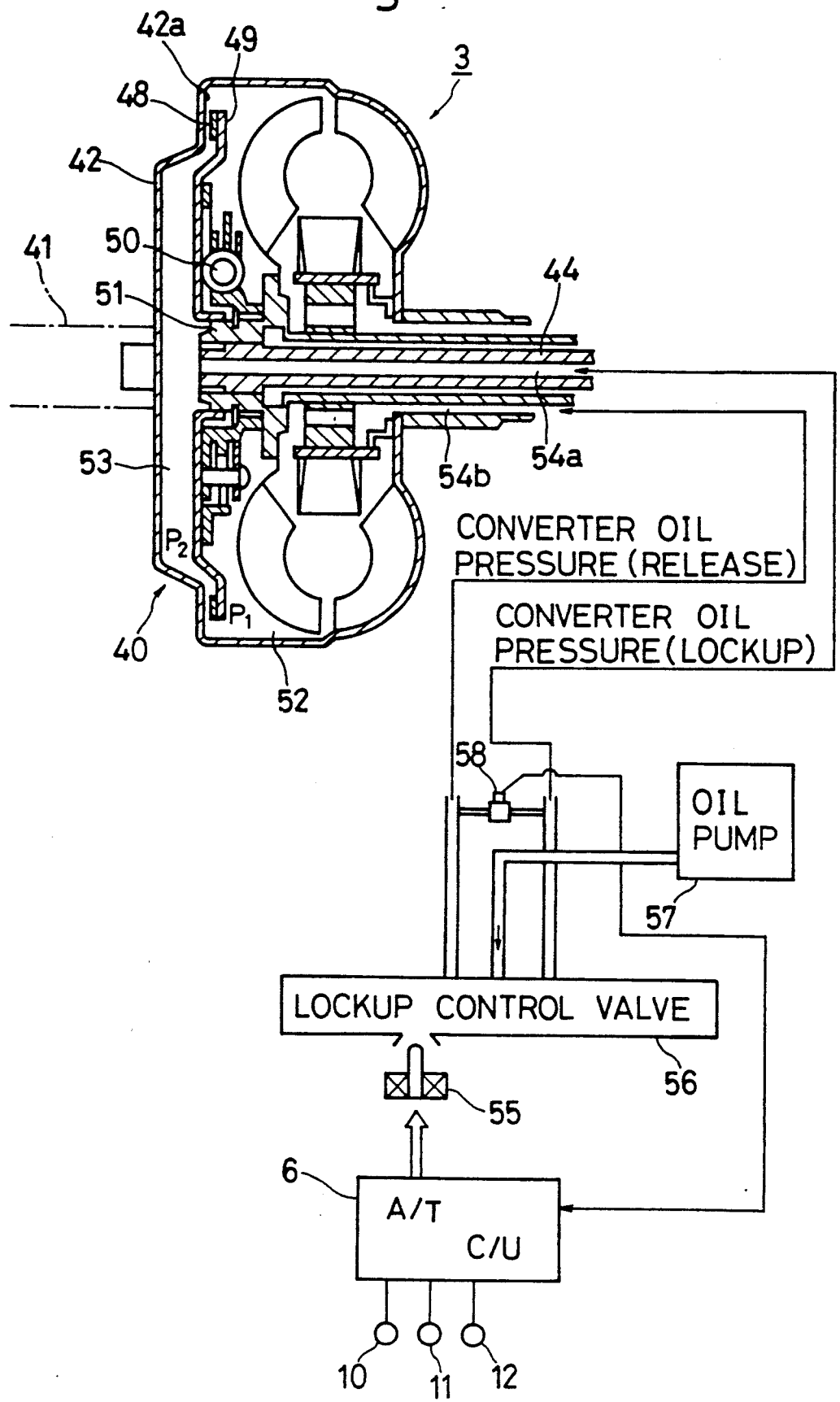
FIG. 4 is a sectional view showing a lockup mechanism provided at a torque converter in the above preferred embodiment.

In addition to the above automatic transmission, a lockup mechanism 40 shown in FIG. 4 is provided at the above torque converter 3 in this preferred embodiment, and the control unit 6 for automatic transmission also carries out lockup control of the torque converter 3 by the above lockup mechanism through control of the lockup solenoid.

In FIG. 4, a lockup plate 49 (hydraulic clutch) having a clutch facing 48 is arranged integrally with a torsion damper 50 in opposite to an inner wall 42a of a portion on the side of a driving shaft 41 of a case 42, and the torsion damper 50 is spline-engaged with a clutch hub 51, and the clutch hub 51 is spline-engaged with a driven shaft 44.

By this, the lockup plate 49 is made movable in the axial direction of the driven shaft 54 and moved according to pressures P1 and P2 of a pressure chamber 52 and a pressure chamber 53 formed on both sides of the lockup plate 49. Incidentally, a converter oil pressure (working oil pressure) is supplied to the pressure chamber 52 through a pressure passage 54b, while the converter oil pressure is supplied to the pressure chamber 53 through a pressure passage 54a.

Here, when $P1 > P2$, the lockup plate 49 is moved to the left in FIG. 4 and pressed against the inner wall 42a of the case 42 to be in the lockup state where the drive shaft 41 is mechanically engaged with the driven shaft 54 (direct engagement state of clutch), and when $P2 > P1$, conversely, the lockup plate 49 is moved to the right in FIG. 4 and separated from the inner wall 42a of the case 42 to be in the non-lockup state (torque converter state). Supply of the converter oil pressure (working oil pressure) to the pressure chambers 52 and 53 through the above oil pressure passages 54b and 54a is controlled by a lockup solenoid 55 among the above solenoid valve group 5.

That is, by controlling the lockup solenoid 55, action of a lockup control valve 56 is controlled and a converter oil pressure circuit connected to the lockup control valve 56 is switched to the release side or the lockup side of the lockup plate 49. Here, the lockup solenoid 55 is duty controlled by the control unit 6, and when OFF time is long, as the converter oil pressure supplied from an oil pump 57 works on the pressure chamber 53 and oil flows into the pressure chamber 52 from the pressure chamber 53, the state becomes $P2 > P1$ which is the lockup release state, and when the OFF time is short, conversely, the converter oil pressure works on the pressure chamber 52 to bring it to the $P1 > P2$ state, where the lockup plate 49 is pressed against the inner wall 42a of the case 42 to be in the lockup state. Moreover, by adequately reducing the converter oil pressure P2 working on the pressure chamber 53 based on the above OFF time proportion, the state can be brought into semi-clutch.

As mentioned above, the lockup plate 49 is controlled by a differential pressure $|P1-P2|$ between the pressure chambers 52 and 53, and in order to detect the above differential pressure PR, a differential pressure sensor 58 is provided as an oil pressure detecting means (See FIG. 1) into which the oil pressures of the oil pressure passages 54a and 54b are introduced, respectively.

Incidentally, the above drive shaft 41 is linked with the output shaft of the engine 1, and the driven shaft 44 is linked with the shaft of the gear type transmission 4.

Figure 1:
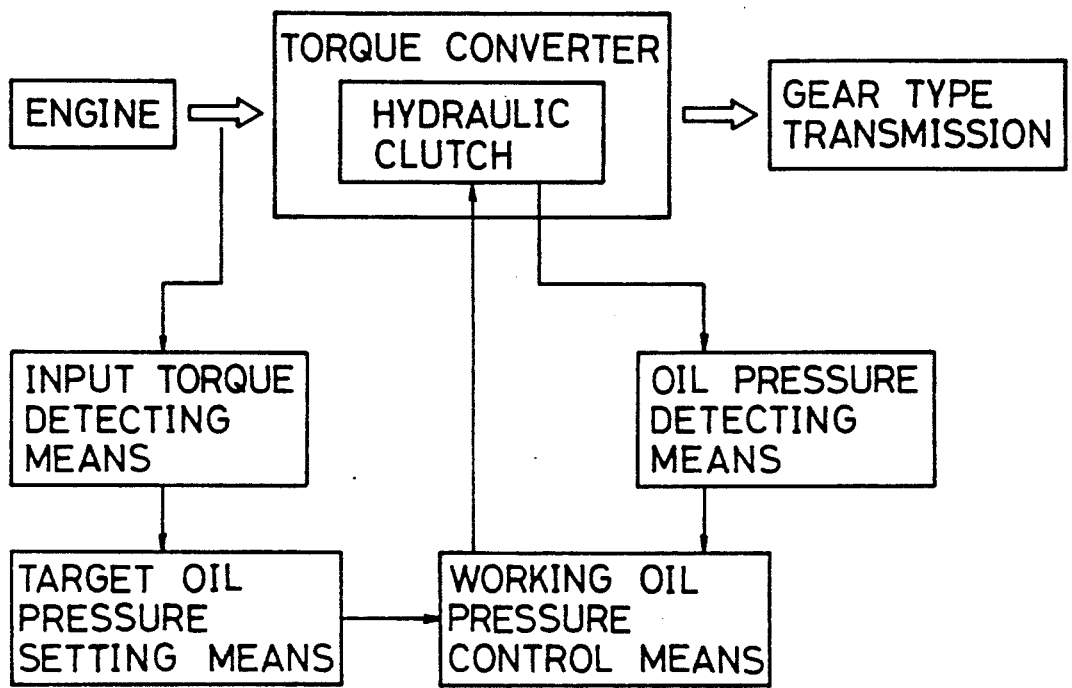
FIG. 1 is a block diagram showing a basic constitution of a control device according to the present invention, which is the constitution to set a target oil pressure based on input torque.

Then, a first preferred embodiment of lockup control by the control unit 6 using the above differential pressure sensor 58 (preferred embodiment of the invention whose basic constitution is shown in FIG. 1) will be described according to the flowcharts in FIG. 5 and FIG. 6.

Figure 5:
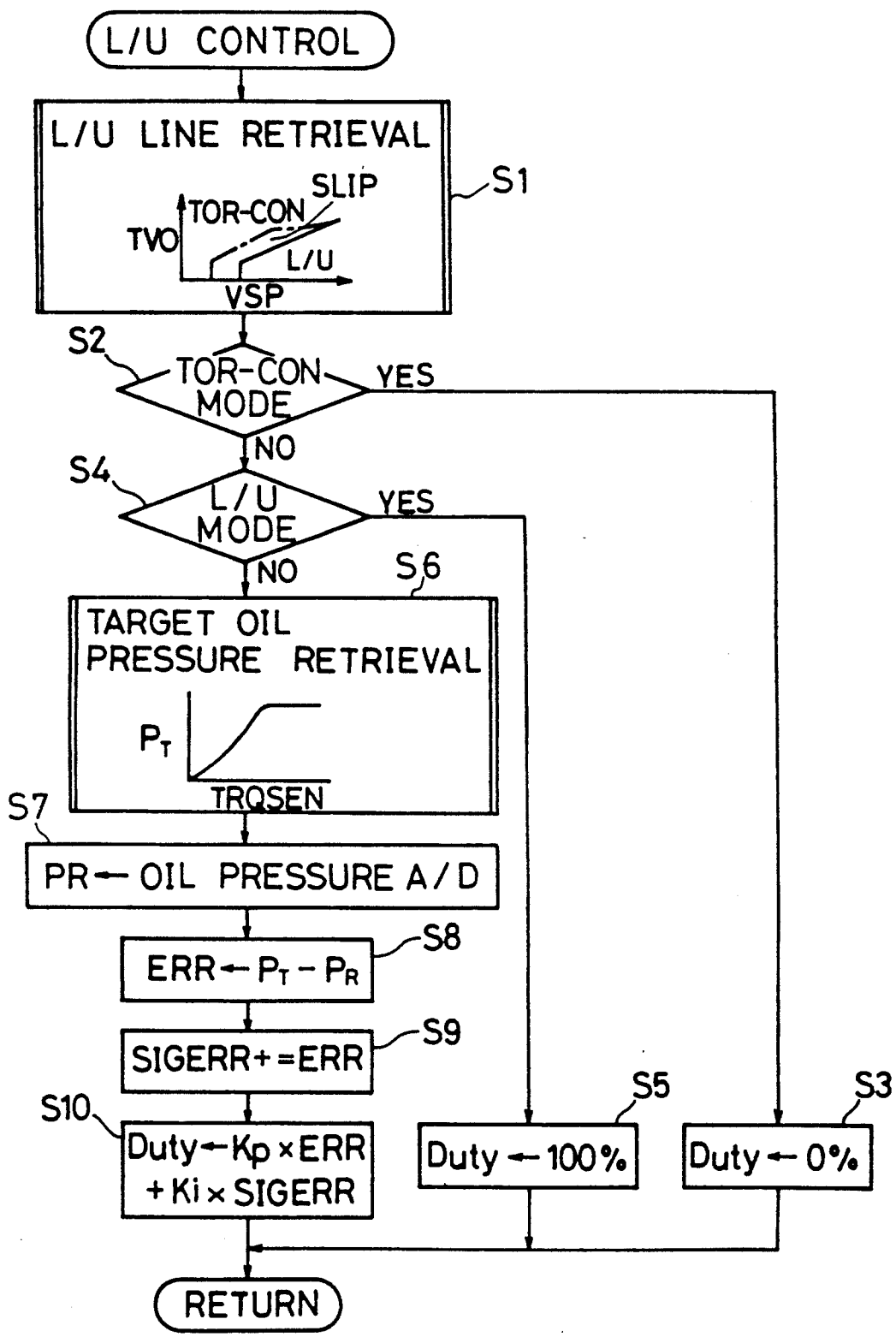
FIG. 5 is a flowchart showing lockup control of a first preferred embodiment corresponding to the invention shown in FIG. 1.

In this preferred embodiment, the control unit 6 is provided with functions of a target oil pressure setting means and a working oil pressure control means (See FIG. 1) in the software manner as shown in the flowchart of FIG. 5. Also, in this preferred embodiment, as the input torque of the torque converter 3 is captured as generated torque of the engine 1 and the generated torque of the engine is calculated based on the intake air flow Q and the engine revolution speed Ne as shown in the flowchart in FIG. 6, a function as an input torque detecting means is realized by the air flow meter 11 (intake air flow detecting means), the crank angle sensor 12 (revolution speed detecting means) and the control unit 6.

First, at Step 1 (S1 in Figs. The same applies to the remainder), a lockup control map which was set in advance based on the car speed VSP and the throttle valve opening degree TVO is referred to, and it is judged whether the lockup state corresponding to the current car speed VSP and the opening degree TVO is the full lockup (clutch direct engagement state), slip lockup (semi-clutch state) or non-lockup (clutch release state, torque converter state), and the lockup control state is set.

And at the next Step 2, it is judged if the lockup control state corresponding to the current driving condition which was set referring to the map is the non-lockup state (tor-con mode) or not, and if it is the non-lockup state, the program goes to Step 3.

At Step 3, a duty ratio Duty, which is an ON time proportion of a driving duty signal to be sent to the lockup solenoid 55 is set at 0% and the lockup solenoid 55 is brought into the OFF state to control it to the non-lockup state.

In the meantime, when it is judged at Step 2 that the non-lockup state is not set, the program goes to Step 4, wherein it is judged whether the full lockup state (lockup mode) is set or not.

And if the full lockup state is set, the program goes to Step 5, wherein the above duty ratio Duty is set at 100% and the lockup solenoid 55 is brought into the ON state to control it to the full lockup state.

When it is judged at Step 4 that the full lockup state is not set, as the remaining slip lockup state should have been set, slip lockup control is executed after Step 6.

At Step 6, a target PT of the differential pressure PR detected by the above differential pressure sensor 58 is retrieved and obtained from the map which stores in advance the above target PT corresponding to input torque TRQSEN of the torque converter 3.

Figure 6:
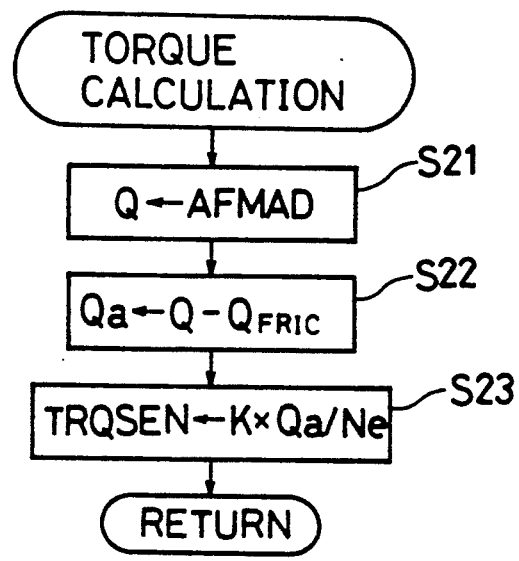
FIG. 6 is a flowchart showing calculation of the engine output torque of the above first preferred embodiment.

The above input torque TRQSEN corresponds to the engine output torque and is calculated according to the flowchart in FIG. 6. In FIG. 6, first, at Step 21, a detection signal put out of the air flow meter 11 according to the intake air flow Q is A/D converted and read.

At the next Step 22, an amount QFRIC corresponding to a friction loss of the engine is subtracted for correction from the intake air flow Q detected by the air flow meter 11 and the correction result is set at Qa.

And at the next Step 23, a value obtained by dividing the above intake air flow Qa by the engine revolution speed Ne is multiplied by a constant K to set the engine output torque TRQSEN ($\leftarrow K \times Qa/Ne$) which is in proportion to a cylinder intake air flow.

When explained referring back to the flowchart in FIG. 5, the engine output torque as calculated above is set as the input torque TRQSEN of the torque converter 3, and the target PT corresponding to this input torque TRQSEN is set at Step 6, and then, at Step 7, a detection signal from the differential pressure sensor 58 is A/D converted and read and it is set at PR.

And at Step 8, a deviation is obtained by subtracting an actual differential pressure PR from the target PT and it is set at an error amount ERR.

At Step 9, an error amount ERR newly calculated this time at the above Step 8 is added to an integral value SIGERR of the above error amount ERR so as to be renewed.

At Step 10, a proportional control amount obtained by multiplying the error amount ERR calculated at Step 8 by a predetermined proportional constant Kp and an integral amount obtained by multiplying the integral value SIGERR calculated at Step 9 by a predetermined integral constant Ki are added together to be set at the above duty ratio Duty.

That is, the lockup solenoid 55 is proportional-plus-integral controlled so that the actual differential pressure detected by the differential pressure sensor 58 (oil pressure working on the lockup plate 49) gets close to the target PT corresponding to the input torque TROSEN of the torque converter 3. As the above differential pressure corresponds to the pressing force of the lockup plate 49, the lockup mechanism 40 is given a torque capacity for a predetermined slip lockup state, that is, a torque capacity that a difference in rotation speeds between the input and the output shafts becomes a predetermined value by appropriately changing the above pressing force according to the input torque.

The above preferred embodiment is the constitution that the target differential pressure necessary to obtain the desired slip lockup state is generated from the input torque of the torque converter 3, and the control is carried out so that the actual differential pressure gets close to the target differential pressure. Thus, the slip lockup control for controlling the rotation speed difference of the input and the output rotation shafts of the torque converter to a predetermined value can be realized without using information of the above rotation speed difference which is hard to be calculated at high speed and with high accuracy, and as the differential pressure PR can be directly read after A/D conversion of the detection signal from the differential pressure sensor 58, the lockup control to bring the differential pressure PR (clutch lockup force) close to the target can be realized at high speed and with high accuracy.

Incidentally, in the above first preferred embodiment, though the slip lockup control is carried out based on the differential pressure PR, the control can be executed by setting in advance a proper target differential pressure that can realize full lockup (control to bring the rotation speed difference to zero) corresponding to change in the input torque so that the oil pressure working on the clutch at the time of full lockup becomes the above target differential pressure. In this case, as the oil pressure can be properly changed corresponding to the input torque, such a problem can be avoided that control to release the clutch is delayed by useless supply of the oil pressure.

Figure 2:
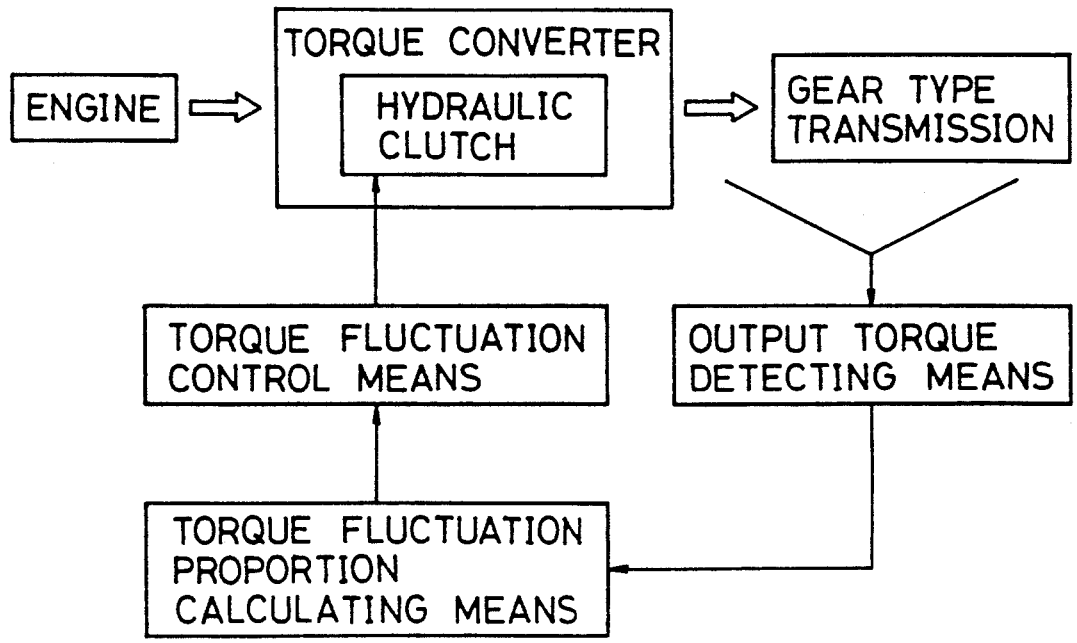
FIG. 2 is a block diagram showing a basic constitution of a control device according to the present invention, which is the constitution to control an oil pressure based on a fluctuation proportion of output torque.

Next, a second preferred embodiment of the lockup control by the control unit 6 without using the differential pressure sensor 58 but using the torque sensor 10 (preferred embodiment of the invention whose basic constitution is shown in FIG. 2) will be described according to the flowcharts in FIG. 7 and FIG. 8.

Figure 8:
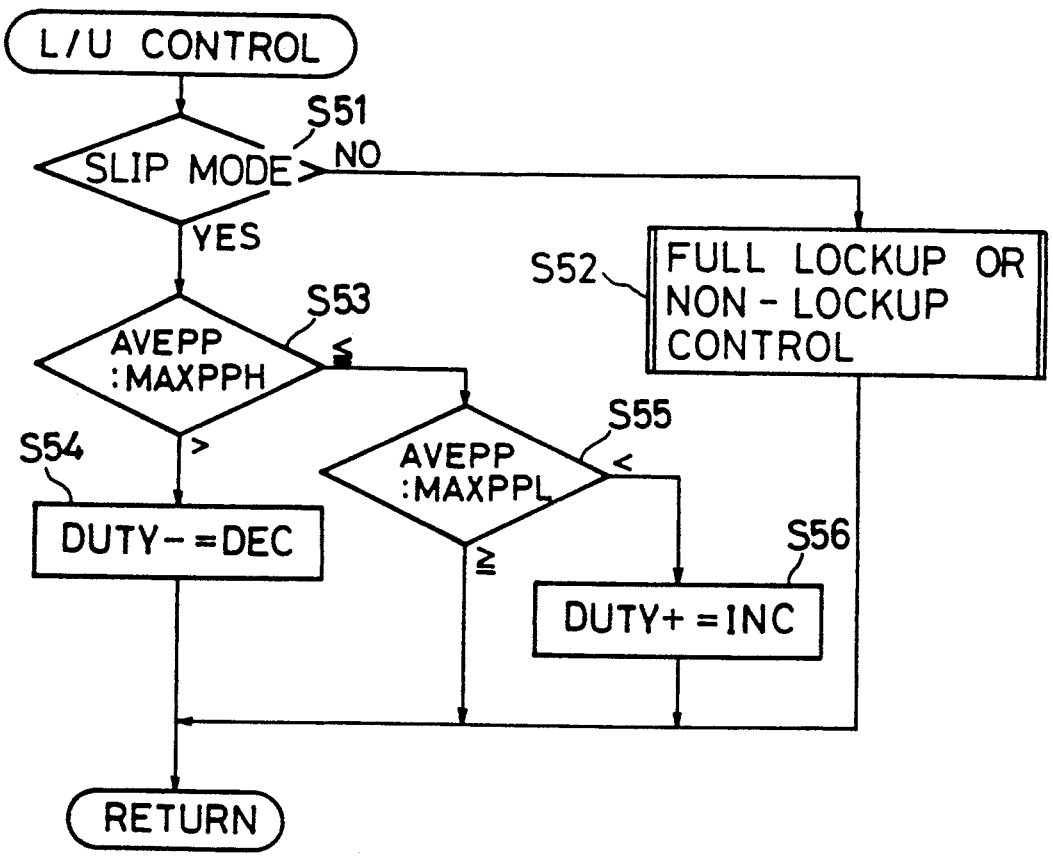
FIG. 8 is a flowchart showing lockup control of the second preferred embodiment.
Figure 7:
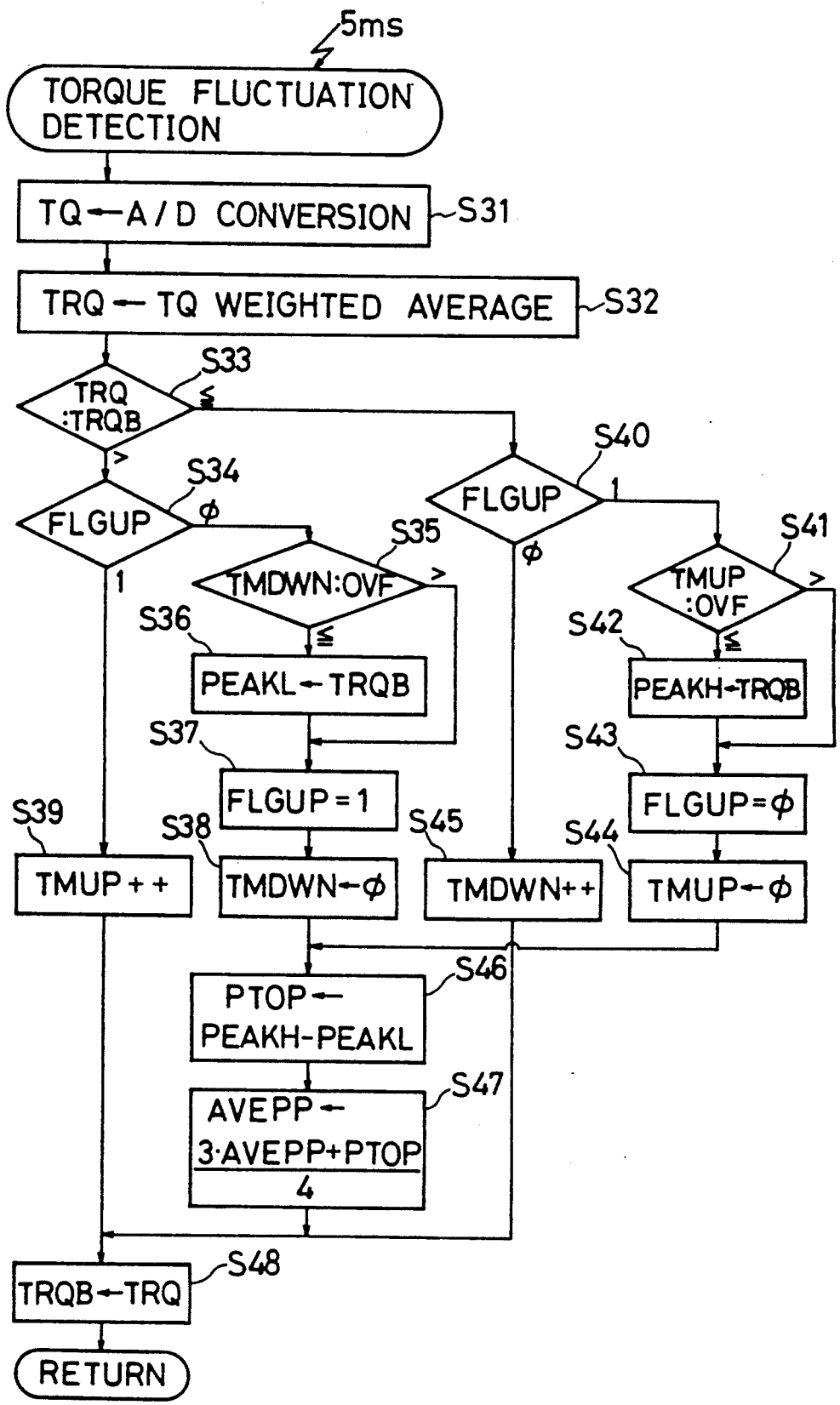
FIG. 7 is a flowchart showing calculation of a torque fluctuation proportion of a second preferred embodiment of the invention shown in FIG. 2.

In the second preferred embodiment, the control unit 6 is provided with functions as a torque fluctuation proportion detecting means and a torque fluctuation control means (See FIG. 2) in the software manner as shown in the flowcharts in FIG. 7 and FIG. 8.

The flowchart in FIG. 7 shows a program to calculate a torque fluctuation proportion on the output side of the torque converter 3, executed per predetermined micro time (per 5 ms, for example).

First, at step 31, a detection signal from the torque sensor 10 is A/D converted and read and it is set at TQ, and at the next Step 32, a weighted average value TRQ of the above detected torque TQ is obtained. It is desirable that the detection signal from the torque sensor 10 is made to pass through a low-pass filter before A/D conversion.

At the next Step 33, a weighted average result TRQB at Step 32 at the last execution of this program is compared with the weighted average result TRQ at Step 32 this time.

In step 33, the present value and the last value are compared so as to determine whether the torque has increased or decreased. If it is determined that the torque has increased since the last measurement, the value of TMUP is counted up by the counter in step 39. If the torque has decreased since the last measurement, the value of TMDWN is counted up by the counter in step 45.

When the torque TRQ is increased since the last time, the program goes to Step 34, wherein a flag FLGUP indicating the increasing tendency of the torque TRQ is judged. When zero has been set at the above flag FLGUP, it shows that the torque TRQ has been in the decreasing tendency till the last time, as will be described later, and the program goes to Step 35 in this case.

The value FLGUP indicates whether the torque is increasing or decreasing. FLGUP is reset irrespective of the value of TMDWN or TMUP. In other words, when an increase in torque is continuously detected in step 33, FLGUP is set to "1". When the torque is changed from a state of increasing (FLGUP="1") to a state of decreasing, the program advances to step 40. After the value of FLGUP is recognized as being "1" in step 40, the program advances to step 43 irrespective of the value of TMUP, with FLGUP then being set to "0" to indicate the decreasing tendency of the torque.

At Step 35, TMDWN at which continuation time of the decreasing tendency of the torque TRQ is set is compared with a predetermined time OVF. When the decreasing tendency continuation time TMDWN is longer than the predetermined time OVF, it is considered that the torque fluctuation is not to be restrained but it accompanies normal acceleration or deceleration, but when the decreasing tendency continuation time TMDWN is shorter than the predetermined time OVF, it is considered that the torque of the transmission output shaft is fluctuated as a result of transmission of the engine vibration through the torque converter 3.

And when the decreasing tendency continuation time TMDWN is shorter than the predetermined time OVF, the program goes to Step 36, wherein the weighted average value TRQB last time is set at a lower peak value PEAKL of the above torque fluctuation cycle.

In the present invention, the change of output torque is used to determine whether the lockup force of the lockup clutch is excessive or insufficient. In particular, if the lockup force of the lockup clutch is large during low speed driving of the engine with large vibration of the drive train, the output torque will fluctuate. Given such fluctuation it is desirable to control the lockup force so that it is reduced accordingly.

However, a change of output torque due to acceleration or deceleration will not be representative of whether the lockup force is excessive or insufficient. Therefore, it is necessary to distinguish the change of output torque due to acceleration or deceleration drive from that generated due to the excessive lockup force of the lockup clutch.

Since it can be assumed that the change of output torque generated as a result of an excessive lockup force of the lockup clutch occurs at relatively high frequency, the values TMDWN and TMUP are measured so as to determine the period of the change of output torque based on the TMDWN and the TMUP.

In other words, when a change of outputs torque in a constant direction continues over a predetermined time OVF, it is determined that the changes in the output torque are low frequency and thus deemed to be a change due to acceleration or deceleration drive of the engine.

At Step 37, as it was detected at Step 33 that the torque is changed from the decreasing tendency to the increasing tendency this time, 1 is set at the above flag FLGUP, and at the next Step 38, the above TMDWN is reset to zero to newly measure the decreasing continuation time of the torque TRQ.

In the meantime, when the increasing tendency of the torque TRQ is continuously detected at Step 33, it means that 1 is judged to be set at the flag FLGUP at Step 34, and the program goes from Step 34 to Step 39, wherein the increasing continuation time TMUP of the torque TRQ is counted up.

Also, at Step 33, when it is judged that the torque TRQ is in the decreasing tendency, it is judged based on the flag FLGUP whether the torque is changed from the increasing tendency to the decreasing tendency or not (Step 40), as with the increasing tendency, and at the first reversion to the decreasing tendency, an upper peak value PEAKH of the torque fluctuation is renewed based on the increasing tendency continuation time TMUP till the last time (Steps 41 and 42) and the flag FLGUP and the increasing tendency continuation time TMUP are reset (Steps 43 and 44). Also, when the torque TRQ is continuously decreasing, the decreasing continuation time TMDWN is counted up (Step 45).

Moreover, at the first reversion between the increasing and decreasing tendencies of the torque TRQ, the program goes to Step 46, wherein a fluctuation width PTOP of the torque TRQ is calculated as PEAKH-PEAKL. At the next Step 47, the torque fluctuation width PTOP obtained at Step 46 this time and a weighted average value AVEPP of the above torque fluctuation width PTOP till the last time are weighted-averaged so as to renew the weighted average value AVEPP of the torque fluctuation width PTOP.

As mentioned above, when a decrease of the torque is detected, FLGUP is set to "0"; conversely, FLGUP is set to "1" when an increase in torque is detected. For example, in a case where the decreasing tendency of the torque is detected in step 33 and then the program goes to step 40, and further if FLGUP="1" is judged in step 40, it can be understood that the increasing tendency of the torque was detected at the last execution and accordingly, the decreasing tendency detected in step 33 is the first reversion from the increasing tendency to the decreasing tendency. This first reversion indicates a change of torque direction.

Also, at every execution of this program, the latest torque TRQ is set at the last value TRQB at Step 48.

The weighted average value AVEPP of the torque fluctuation width PTOP calculated as above is used for the slip lockup control of the above lockup mechanism 40 as shown in the flowchart of FIG. 8.

In the flowchart of FIG. 8, first at Step 51, the map as shown at Step 1 of the flowchart of FIG. 1 is referred to so as to judged if the current driving condition is in the zone to carry out slip lockup or not.

And if the condition is in the full lockup zone other than the slip lockup zone or in the non-lockup zone, the program goes to Step 52, wherein the control as mentioned above is carried out to switch the duty ratio Duty to 100% or 0%.

In the meantime, if it is judged that the condition is in the slip lockup zone, the program goes to Step 53, wherein the weighted average value AVEPP of the torque fluctuation width PTOP calculated in the flowchart of FIG. 7 is compared with a maximum value MAXPPH of a control width of the weighted average value AVEPP.

When the torque fluctuation width AVEPP exceeds the maximum value MAXPPH, it is presumed that the lockup force is so strong that engine vibration can not be absorbed by slip of the torque converter 3, and the program goes to Step 54 so as to weaken the above lockup force and decreasingly correct the above duty ratio Duty by a predetermined value.

In the meantime, when it is judged at Step 53 that the torque fluctuation width AVEPP is less than the maximum value MAXPPH, the program goes to Step 55, wherein a minimum value MAXPPL of the control width (<MAXPPH) is compared with the torque fluctuation width AVEPP.

When the torque fluctuation width AVEPP is less than the minimum value MAXPPL, it is presumed that even if the lockup force is further increased so as to heighten efficiency, the torque fluctuation width is fully restrained, and the program goes to Step 56, wherein the above duty ratio Duty is increasingly corrected by a predetermined value.

Also, when it is judged at Step 55 that the torque fluctuation width AVEPP is more than the minimum value MAXPPL, as the torque fluctuation width AVEPP is between the maximum value MAXPPH and the minimum value MAXPPL and improvement in efficiency by lockup is compatible with the absorbing action of the engine vibration, the program is ended without correcting the above duty ratio Duty.

That is, according to this second preferred embodiment, both improvement in efficiency, which is the purpose of slip lockup, and reduction in engine vibration can be realized by having the torque fluctuation of the output side of the torque converter 3 converge within a predetermined control width. With the first preferred embodiment, there is a possibility that a desired effect to control the difference in rotation speeds between the input and the output shafts of the torque converter to a constant level might not be achieved if there is a dispersion factor such as a dispersion in a friction coefficient of the clutch facing 48, but with this second preferred embodiment, as the actual torque fluctuation is detected, the slip lockup can be controlled with high accuracy taking into account of the above dispersion factor, and the number of processes to initialize the target oil pressure PT in the first preferred embodiment can be saved.

Also, with the second preferred embodiment, the slip lockup control to control the rotation speed difference between the input and the output shafts of the torque converter to a predetermined value can be realized without using information of the above rotation speed difference, and a proper working oil pressure can be supplied to the hydraulic clutch by controlling the lockup solenoid 55 (lockup force) at high speed and with high accuracy based on the torque data obtained by A/D converting the detection signal from the torque sensor 10.

I claim:

1. A control device for an automatic transmission of a vehicle comprising:
    a torque converter having an input shaft which is drivingly connected to an output shaft of an engine and an output shaft which is drivingly connected to an input shaft of a gear type transmission;
    a hydraulic clutch for mechanically and directly engaging said input shaft of said torque converter with said output shaft of said torque converter, wherein said hydraulic clutch is operated by a differential pressure between an oil pressure for driving the clutch to a lockup side and an oil pressure for driving the clutch to a release side;
    an oil pressure detecting means for detecting said differential pressure as an oil pressure working on said hydraulic clutch;
    an input torque detecting means for detecting input torque of said torque converter;
    a target oil pressure setting means for setting a target oil pressure based on input torque detected by said input torque detecting means; and
    a working oil pressure control means for controlling supply of a working oil pressure for said hydraulic clutch so that an actual oil pressure detected by said oil pressure detecting means approaches the target oil pressure set by said target oil pressure setting means.

2. A control device for an automatic transmission of a vehicle comprising:
    a torque converter having an input shaft which is drivingly connected to an output shaft of an engine and an output shaft which is drivingly connected to an input shaft of a gear type transmission;
    a hydraulic clutch for mechanically and directly engaging said input shaft of said torque converter with said output shaft of said torque converter,
    an oil pressure detecting means for detecting an oil pressure working on said hydraulic clutch;
    an input torque detecting means for detecting input torque of said torque converter;
    a target oil pressure setting means for setting a target oil pressure based on input torque detected by said input torque detecting means; and
    a working oil pressure control means for controlling supply of a working oil pressure for said hydraulic clutch so that an actual oil pressure detected by said oil pressure detecting means approaches the target oil pressure set by said target oil pressure setting means, wherein said working oil pressure control means carries out proportional-plus-integral control of a control value of said oil pressure based on a deviation between a target oil pressure set by said target oil pressure setting means and an oil pressure detected by said oil pressure detecting means.

3. A control device for an automatic transmission of a vehicle according to claim 1 wherein said input torque detecting means comprises an intake air flow detecting means for detecting an intake air flow of the engine and a revolution speed detecting means for detecting an engine revolution speed, and a value in proportion to an air flow per stroke calculated based on said detected intake air flow and revolution speed is set as input torque.

4. A control device for an automatic transmission of a vehicle according to claim 1 wherein a target oil pressure set by said target oil pressure setting means is an oil pressure to bring the rotation speed difference between the input and the output shafts of said torque converter to a predetermined value.

5. A control device for an automatic transmission of a vehicle comprising:
a torque converter placed between an output shaft of an engine and an input shaft of a gear type transmission;
a hydraulic clutch for mechanically and directly engaging and input shaft with an output shaft of said torque converter;
an output torque detecting means for detecting torque on the output side of said torque converter;
a torque fluctuation proportion calculating means for calculating a fluctuation proportion of torque detected by said output torque detecting means; and
a torque fluctuation control means for controlling supply of a working oil pressure for said hydraulic clutch so that the fluctuation proportion of torque calculated by said torque fluctuation proportion calculating means becomes less than a predetermined value.

6. A control device for an automatic transmission of a vehicle according to claim 5 wherein said torque fluctuation proportion calculating means measures a time during which said detected output torque is continuously decreased and a time of continuous increase, respectively, and when the measured time in the decreasing direction and the time in the increasing direction are both less than a predetermined time, a maximum value and a minimum value of the output torque is obtained and a deviation between said maximum value and minimum value is calculated as a fluctuation proportion of the output torque.

7. A control device for an automatic transmission of a vehicle according to claim 5 wherein said torque fluctuation proportion calculating means calculates a weighted average value of torque detected by said output torque detecting means, and a fluctuation proportion of the torque is calculated based on said weighted average value.

8. A control device for an automatic transmission of a vehicle according to claim 5 wherein said torque fluctuation control means carries out control of a working oil pressure based on said fluctuation proportion of torque only in the driving condition where said hydraulic clutch is brought into a slip-lock-up state.

9. A method for controlling an automatic transmission of a vehicle, said method comprising the steps of:
detecting an oil pressure working on a hydraulic clutch which directly and mechanically engages an input shaft with an output shaft of a torque converter placed between an output shaft of an engine and an input shaft of a gear type transmission;
detecting input torque of said torque converter;
setting a target oil pressure based on said detected input torque of the torque converter; and
controlling supply of the working oil pressure on said hydraulic clutch so that the oil pressure working on said hydraulic clutch gets close to said set target oil pressure.

10. A method for controlling an automatic transmission of a vehicle according to claim 9 wherein said hydraulic clutch is a hydraulic clutch controlled according to a differential pressure between an oil pressure for driving the clutch to the lockup side and an oil pressure for driving the clutch to the release side, and at said step for detecting the oil pressure, said differential pressure is detected as an oil pressure working on said hydraulic clutch.

11. A method for controlling an automatic transmission of a vehicle according to claim 9 wherein said step for controlling supply of the working oil pressure, proportional-plus-integral control of a control value of said oil pressure is carried out based on a deviation between said target oil pressure and an actual oil pressure working on said hydraulic clutch.

12. A method for controlling an automatic transmission of a vehicle, said method comprising the steps of:
detecting an oil pressure working on a hydraulic clutch which directly and mechanically engages an input shaft with an output shaft of a torque converter placed between an output shaft of an engine and an input shaft of a gear type transmission;
detecting input torque of said torque converter;
setting a target of said oil pressure based on said detected input torque of the torque converter; and
controlling supply of the working oil pressure on said hydraulic clutch so that the oil pressure working on said hydraulic clutch gets close to said set target oil pressure;
wherein said step for detecting the input torque comprises the steps of detecting an intake air flow of the engine, detecting a revolution speed of the engine, and setting a value in proportion to an air flow per stroke calculated based on said detected intake air flow and revolution speed as input torque.

13. A method for controlling an automatic transmission of a vehicle according to claim 9 wherein said step for setting the target oil pressure, an oil pressure for bringing said rotation speed difference between the input and the output shafts of the torque converter to a predetermined value is set as a target oil pressure.

14. A method for controlling an automatic transmission of a vehicle comprising:
detecting torque on the output side of a torque converter placed between an output shaft of an engine and an input shaft of a gear type transmission;
calculating a fluctuation proportion of said torque on the output side; and
controlling supply of a working oil pressure for a hydraulic clutch which directly and mechanically engages an input shaft with an output shaft of said torque converter so that said calculated fluctuation proportion of torque becomes less than a predetermined value.

15. A method for controlling an automatic transmission of a vehicle according to claim 14 wherein said step for calculating the fluctuation proportion of torque, a time during which the output torque of said torque converter is continuously decreased and a time of continuous increase are measured, respectively, and when said measured time in the decreasing direction and the time in the increasing direction are both less than a predetermined time, a maximum value and a minimum value of the output torque are obtained and a deviation between said maximum value and minimum value is calculated as the fluctuation proportion of the output torque.

16. A method for controlling an automatic transmission of a vehicle according to claim 14 wherein said step for calculating the fluctuation proportion of torque, a weighted average value of said detected output torque is calculated and the fluctuation proportion of torque is calculated based on said weighted average value.

17. A method for controlling an automatic transmission of a vehicle according to claim 5 wherein said step for controlling supply of the working oil pressure, control of the working oil pressure based on said fluctuation proportion of torque is carried out only in the driving condition where said hydraulic clutch is brought into a slip-lock-up state.

* * * * *